United States Patent
McPhail et al.

(10) Patent No.: US 10,343,765 B2
(45) Date of Patent: Jul. 9, 2019

(54) TOROIDAL SPINNER AFT FLANGE

(71) Applicant: United Technologies Corporation, Farmington, CT (US)

(72) Inventors: James J. McPhail, New London, CT (US); Colin J. Kling, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 578 days.

(21) Appl. No.: 15/171,926

(22) Filed: Jun. 2, 2016

(65) Prior Publication Data

US 2017/0349265 A1    Dec. 7, 2017

(51) Int. Cl.
*F02C 7/04* (2006.01)
*B64C 11/14* (2006.01)
*F02K 3/06* (2006.01)

(52) U.S. Cl.
CPC .............. *B64C 11/14* (2013.01); *F02C 7/04* (2013.01); *F02K 3/06* (2013.01); *F05D 2220/32* (2013.01); *F05D 2250/71* (2013.01); *F05D 2300/603* (2013.01)

(58) Field of Classification Search
CPC .......... F01D 5/02; F01D 5/3007; F01D 5/066; F01D 5/32; F02C 7/04
See application file for complete search history.

(56) References Cited

U.S. PATENT DOCUMENTS

| | | | | |
|---|---|---|---|---|
| 3,640,798 A | * | 2/1972 | Deeds | B32B 3/12 428/117 |
| 6,651,308 B2 | * | 11/2003 | Oldani | B23Q 1/52 29/557 |
| 6,672,630 B2 | * | 1/2004 | Pinzauti | F01D 5/06 285/405 |
| 6,951,448 B2 | * | 10/2005 | Duesler | F01D 5/323 416/220 R |
| 8,092,183 B2 | * | 1/2012 | Borzakian | F01D 5/027 416/219 R |
| 8,677,622 B2 | * | 3/2014 | Schreiber | F04D 29/321 29/889.2 |
| 9,970,320 B2 | * | 5/2018 | De Sousa | F01D 9/04 |
| 10,100,644 B2 | * | 10/2018 | Romanowski | F01D 5/066 |
| 2015/0361804 A1 | | 12/2015 | Hubbert | |

FOREIGN PATENT DOCUMENTS

| | | |
|---|---|---|
| EP | 1357254 | 10/2003 |
| EP | 2905456 | 8/2015 |
| WO | 2015084460 | 6/2015 |

OTHER PUBLICATIONS

EP Search Report dated Oct. 23, 2017 in EP Application No. 17174286.9.

* cited by examiner

*Primary Examiner* — Justin D Seabe
(74) *Attorney, Agent, or Firm* — Snell & Wilmer, L.L.P.

(57) ABSTRACT

A spinner for a gas turbine engine may include a substantially-flat inner surface having frustoconical geometry. A flange having semi-toroidal geometry may extend from the spinner with an inner curved surface of the flange being tangential to the inner surface. A mating portion may extend substantially tangentially from the inner curved surface of the flange and configured for fastening to a fan hub.

18 Claims, 3 Drawing Sheets

TOROIDAL SPINNER AFT FLANGE

FIELD

The disclosure relates generally to gas turbine engines and, more particularly, to a spinner having a toroidal aft flange.

BACKGROUND

Rotating components of a gas turbine engine may be joined together by flanges. The spinner on a nose cone, for example, may typically include a flat segment that mates the spinner body having a large diameter to a fan hub having a smaller diameter. The flat segment may be conical and may join a planar aft flange. The conical portion may bend under extreme loading of, for example, impact events. The impact events may thus cause bending in the flat segment having the conical geometry. The flat segment may experience undesirable interlaminar sheer loads in the structure of the flat segment.

SUMMARY

A spinner for a gas turbine engine is provided. The spinner may include a substantially-flat inner surface having frustoconical geometry. A flange having semi-toroidal geometry may extend from the spinner with an inner curved surface of the flange being tangential to the inner surface. A mating portion may extend substantially tangentially from the inner curved surface of the flange.

In various embodiments, the spinner may have a laminar composite structure. A filler may contact the flange with the filler having an annular geometry with a triangular cross section. A flat extension may extend aft from the spinner and have frustoconical geometry. A ratio of a radius of curvature of the flange to a radius of the flange may range from 1:5 to 1:15. The radius of curvature of the flange may also be between 0.5 inches and 3 inches. The flange may have a multi-radial curve. The flange may also be continuously curved from the inner surface to the inner mating surface.

A nose cone assembly is also provided. The nose cone assembly may include a spinner with an inner surface of the spinner having frustoconical geometry. The inner surface may also be substantially flat. A flange having semi-toroidal geometry may extend from the spinner, with an inner curved surface of the flange being substantially tangential to the inner surface of the spinner. A mating portion may extend from the flange. An inner mating surface of the mating portion may be substantially tangential to the inner curved surface of the flange. A fan hub flange may be configured to engage an external mating surface of the mating portion.

In various embodiments, the spinner may have a laminar composite structure. A filler may contact the flange and have an annular geometry with a triangular cross section. A flat extension may extend aft from the spinner, with an annular seal mechanically coupled to the flat extension. A first fastener opening defined by the mating portion may be aligned with a second fastener opening defined by the fan hub flange. A ratio of a radius of curvature of the flange to a radius of the flange may be approximately 1:10. A radius of curvature of the flange may be between 0.5 inches and 3 inches. The flange may be continuously curved from the inner surface to the inner mating surface.

A gas turbine engine is also provided. The gas turbine engine may include a compressor section configured to rotate about an axis, a fan forward of the compressor section, and a nose cone assembly forward of the fan. The nose cone assembly may have a spinner with an aft flange of the spinner fastened to a fan hub flange. The aft flange may have semi-toroidal geometry.

In various embodiments, the spinner may include an inner surface having a substantially flat contour. An inner curved surface of the aft flange may be substantially tangential to the inner surface of the spinner. The spinner may also have a laminar composite structure. A ratio of a radius of curvature of the aft flange to a radius of the aft flange may be between 1:5 and 1:15

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

The present disclosure relates spinners and nose cones on gas turbine engines. The spinner may join a fan hub at an aft flange. The impulse force from an impact on a nose cone and/or spinner during flight may cause sheer loads on the aft flange. The curved aft spinner flange of the present disclosure tends to absorb and distribute stress evenly and thereby tends to minimize the resultant damage from impact events.

Figure 1:
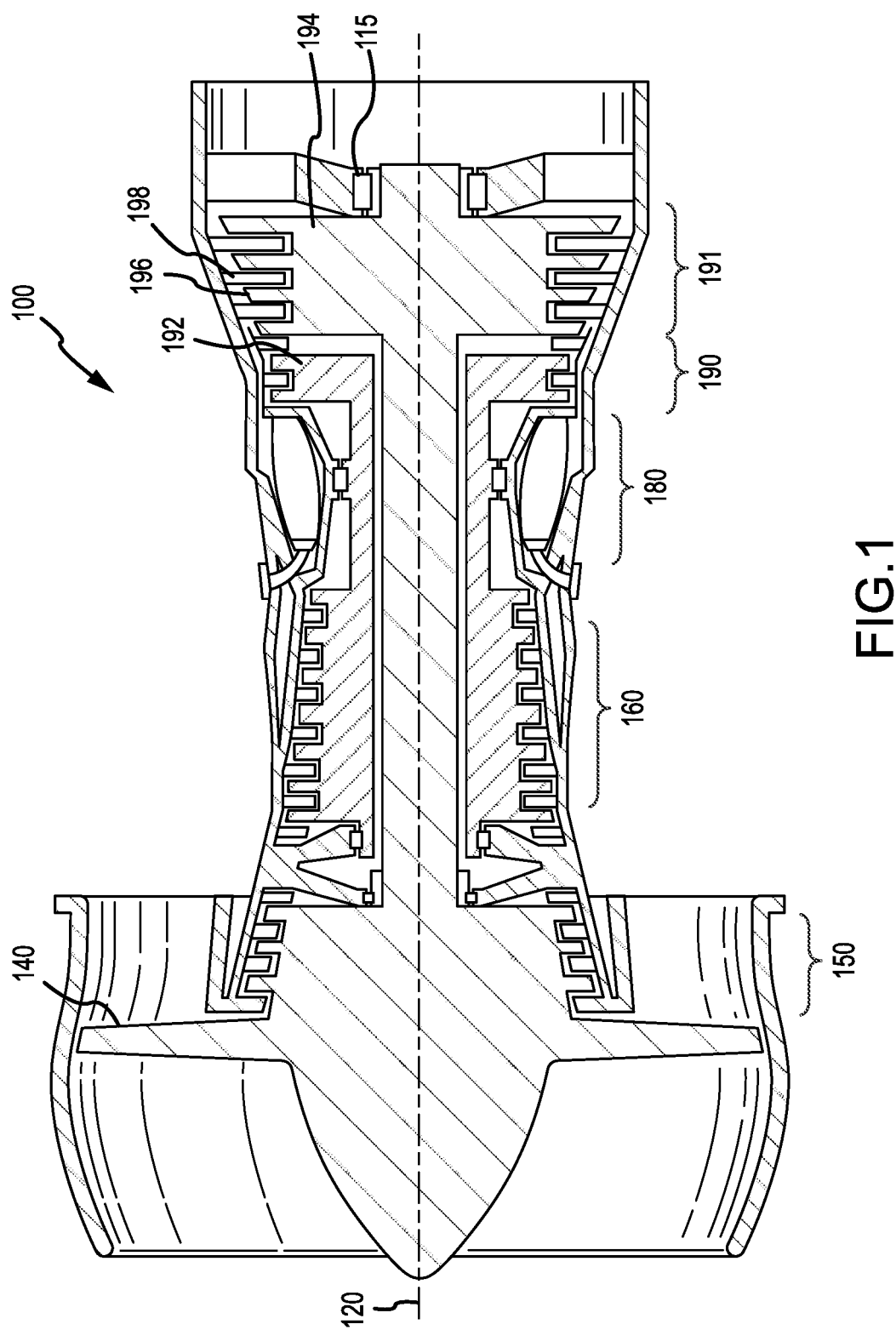
FIG. 1 illustrates an exemplary gas turbine engine, in accordance with various embodiments.

Referring to FIG. 1, a gas turbine engine 100 (such as a turbofan gas turbine engine) is illustrated according to various embodiments. Gas turbine engine 100 is disposed about engine centerline 120, which may also be referred to as axis of rotation 120. Gas turbine engine 100 may comprise a fan 140, compressor sections 150 and 160, a combustion section 180 including a combustor, and turbine sections 190, 191. Air compressed in the compressor sections 150, 160 may be mixed with fuel and burned in combustion section 180 and expanded across the turbine sections 190, 191. The turbine sections 190, 191 may include high pressure rotors 192 and low pressure rotors 194, which rotate in response to the expansion. The turbine sections 190, 191 may comprise alternating rows of rotary airfoils or blades 196 and static airfoils or vanes 198. Cooling air may be supplied to the combustor and turbine sections 190, 191 from the compressor sections 150, 160. A plurality of bearings 115 may support spools in the gas turbine engine 100. FIG. 1 provides a general understanding of the sections in a gas turbine engine, and is not intended to limit the disclosure. The present disclosure may extend to all types of rotating machinery, turbomachinery, and pumps, including turbofan gas turbine engines and turbojet engines, for all types of applications. This may also extend when used in combination with other bearing types in said applications including journal type bearings.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
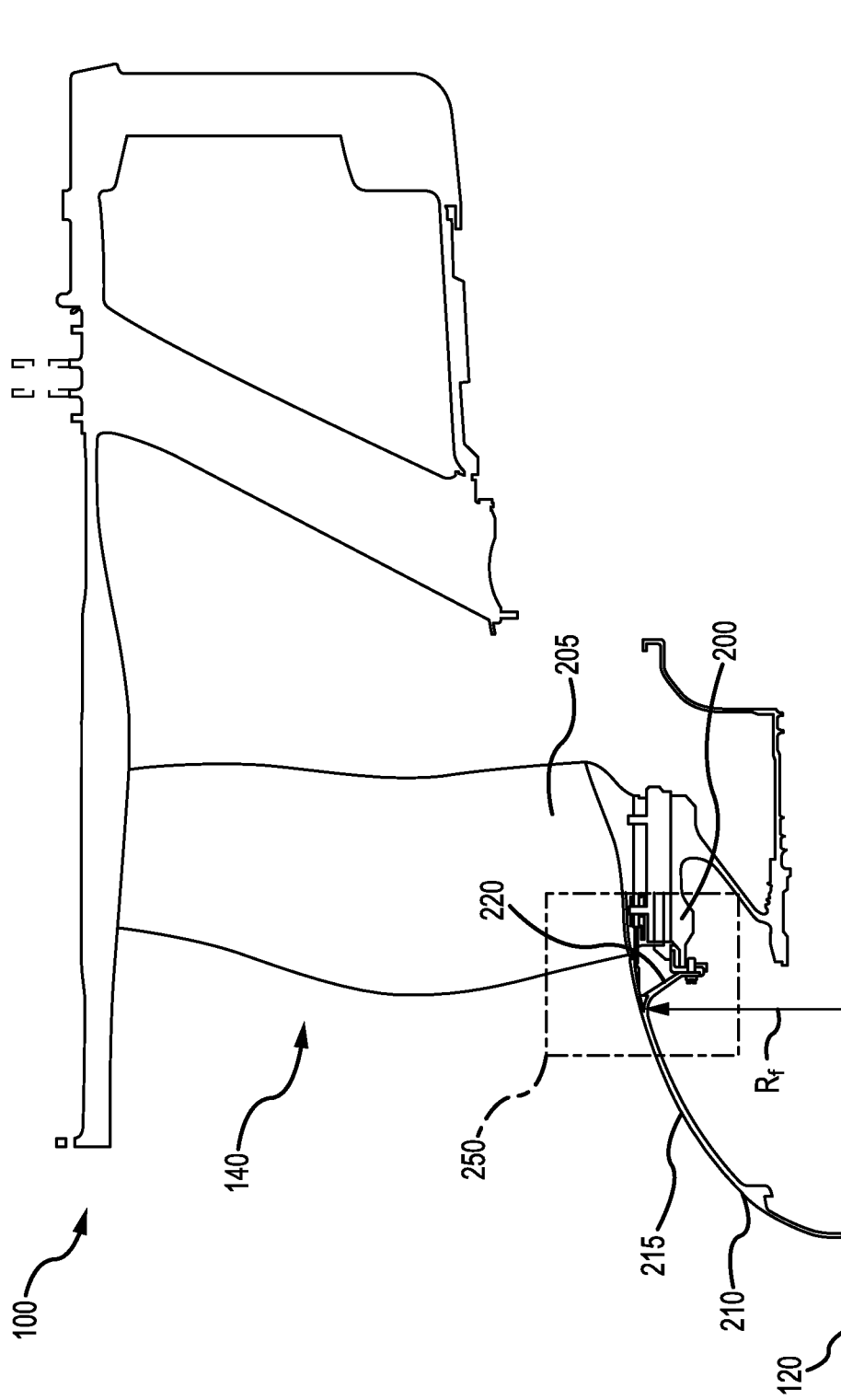
FIG. 2 illustrates a cross-sectional view of a forward portion of a gas turbine engine including a spinner coupled to a fan hub, in accordance with various embodiments.

Referring to FIG. 2, a forward portion of gas turbine engine 100 is shown, in accordance with various embodiments. Gas turbine engine 100 includes nose cone assembly 210. Nose cone assembly 210 may comprise a rotating component coupled to fan hub 200 as illustrated in portion 250 of gas turbine engine 100. Fan hub 200 may be configured to rotate about axis of rotation 120 (of FIG. 1) and retain blades 205 of fan 140. Nose cone assembly 210 may be coupled to fan hub 200 by flange 220. Flange 220 may be the aft flange of spinner 215 and may be a circumferential flange extending radially inward from spinner 215. Flange 220 may have a curved geometry to improve impact absorption and distribution, as described in greater detail below.

Figure 3:
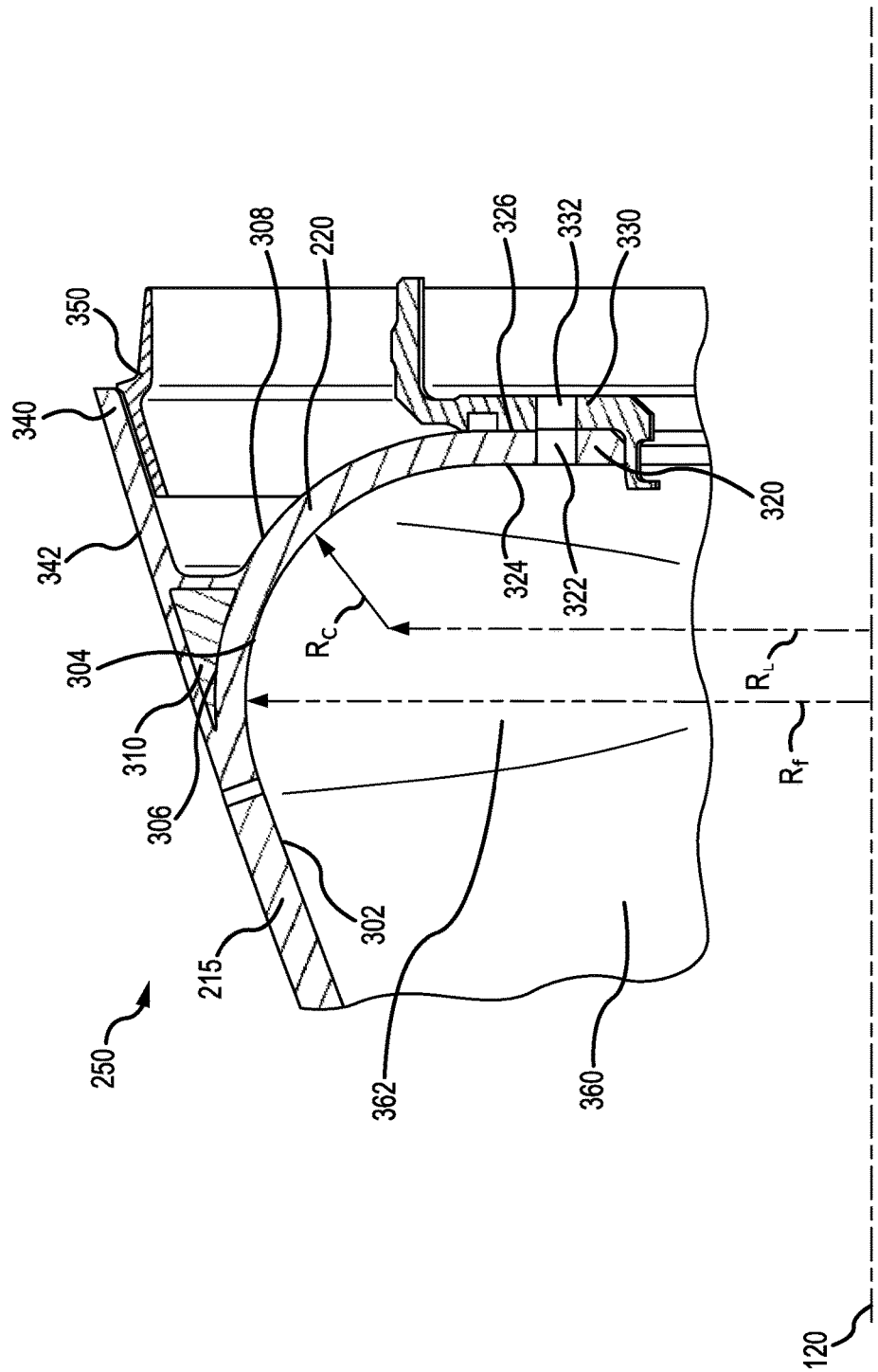
FIG. 3 illustrates a sectional view of a spinner having an aft flange with toroidal geometry, in accordance with various embodiments.

Referring to FIG. 3, portion 250 of a gas turbine engine is shown in greater detail with flange 220 of spinner 215 having toroidal geometry, in accordance with various embodiments. Flange 220 may also be referred to as an aft flange of spinner 215. Spinner 215 may comprise an external surface 342. Spinner 215 may also surround an internal cavity 360 defined by internal surface 302. Internal surface 302 may be substantially parallel to external surface 342.

In various embodiments, internal surface 302 may meet curved internal surface 304 with internal surface 302 being substantially tangential to curved internal surface 304. As used herein, the phrase "substantially tangential" means within +/−5° of tangential. Curved internal surface 304 may have a radial or multi-radial (e.g., by varying $R_C$) contour extending from internal surface 302 to internal mating surface 324 of mating portion 320 of flange 220. Radius of curvature $R_C$ may be located by a radial location $R_L$ at a fixed distance from the axis of rotation 120 for in various embodiments with constant $R_C$ (i.e., with a circular cross section). Curved internal surface may thus be continuously curved from internal surface 302 to internal mating surface 324 without substantially flat segments between internal surface 302 and internal mating surface 324. As used herein, the term "substantially flat" may refer to a flat or slightly curved contour having a radius of curvature greater than the radius $R_f$ of flange 220.

In various embodiments, the radius of curvature $R_C$ of curved internal surface 304 may be less than half the radius $R_f$ of flange 220 from axis of rotation 120. In that regard, the radius of curvature $R_C$ of curved internal surface 304 is such that curved internal surface 304 would form a toroid if curved internal surface 304 were continued along a same or similar radius of curvature. Thus, curved internal surface 304 has toroidal geometry as curved internal surface 304 extends circumferentially about axis of rotation 120. Internal cavity 360 is thus at least partially defined by semi-toroidal surface 362. The phrase "semi-toroidal" is used herein to define any partial toroidal shape and is not limited to a half-toroidal shape. The radius of curvature $R_C$ of curved internal surface 304 may be approximately 1.5 inches (3.8 cm) in engines having the radius $R_f$ of flange 220 (as shown in FIG. 2) in the range of 17 inches (43 cm) to 23 inches (58 cm). The radius of curvature $R_C$ may also range from 0.5 inches (1.3 cm) to 3 inches (7.6 cm) in engines having the radius $R_f$ of flange 220 (as shown in FIG. 2) in the range of 17 inches (43 cm) to 23 inches (58 cm). Thus, the ratio of radius of curvature $R_C$ to radius $R_f$ of flange 220 may be approximately 1:10, and may range from 1:5 to 1:15.

In various embodiments, mating portion 320 of flange 220 may define a fastener opening 322 extending through mating portion 320 from internal mating surface 324 to external mating surface 326. Internal mating surface 324 and external mating surface 326 may be substantially parallel. External mating surface may be configured to engage fan hub flange 330. Fan hub flange 330 may define a fastener opening 332 that is aligned with fastener opening 322 with the fastener openings configured to receive a fastener such as, for example, a bolt or rivet. In that regard, spinner 215 may be mechanically coupled to the fan hub by a fastener that fixes flange 220 to fan hub flange 330.

In various embodiments, a filler 310 may be disposed between flange 220 and flat external surface 342 at a position forward of aft extension 340. Filler 310 may have an annular geometry with a triangular cross section, as illustrated. Filler 310 may provide support for plies and laminate structure of spinner 215, as described in further detail below. Curved surface 306 of filler 310 may contact curved external surface 308 of flange 220. Thus, curved surface 306 of filler 310 may have a similar contour to curved external surface 308 of flange 220. Aft extension 340 of spinner 215 may have frustoconical geometry and may be mechanically coupled to seal 350 having annular geometry.

In various embodiments, spinner 215 and flange 220 may be formed integrally from composite material comprising fibrous plies and a resin matrix. The plies of fibrous material may be formed of strands of carbon fiber, aramid fiber, fiberglass, or other suitable fibers. The plies may be oriented in a layup having the shape of spinner 215 to form a laminar structure. Resin may be introduced to the laminar structure and cured to make spinner 215 having flange 220 with semi-toroidal geometry.

The aft flange having semi-toroidal geometry improves distribution of bending loads and increases energy absorption. The toroidal shape prevents delamination by shifting the direction of the mechanical load and distributing the load throughout the spinner. An optimized toroidal aft flange may thus provide for weight savings, as a thinner, lighter aft flange may withstand the load from impact events.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A spinner for a gas turbine engine comprising:
   an inner surface of the spinner having a first frustoconical geometry;
   a flange having semi-toroidal geometry and extending from the spinner, wherein an inner curved surface of the flange is substantially tangential to the inner surface;
   a mating portion extending from the flange, wherein an inner mating surface of the mating portion is substantially tangential to the inner curved surface; and
   a filler contacting the flange, wherein the filler comprises a continuous annular geometry with a triangular cross section.

2. The spinner of claim 1, wherein the spinner comprises a laminar composite structure.

3. The spinner of claim 1, further comprising an extension extending aft from the spinner, wherein the extension is defined by an external surface parallel to the inner surface with the external surface having a second frustoconical geometry.

4. The spinner of claim 1, wherein a ratio of a radius of curvature of the flange to a radius of the flange ranges from 1:5 to 1:15.

5. The spinner of claim 1, wherein a radius of curvature of the flange is between 0.5 inches and 3 inches.

6. The spinner of claim 1, wherein the flange has a multi-radial curve.

7. The spinner of claim 1, wherein the flange is continuously curved from the inner surface to the inner mating surface.

8. A nose cone assembly comprising:
   a spinner, comprising:
      an inner surface with frustoconical geometry;
      a flange having semi-toroidal geometry and extending from the spinner, wherein an inner curved surface of the flange is substantially tangential to the inner surface of the spinner; and
      a mating portion extending from the flange, wherein an inner mating surface of the mating portion is substantially tangential to the inner curved surface of the flange;
   a fan hub flange configured to engage an external mating surface of the mating portion; and
   a filler contacting the flange, wherein the filler comprises a continuous annular geometry with a triangular cross section.

9. The nose cone assembly of claim 8, wherein the spinner comprises a laminar composite structure.

10. The nose cone assembly of claim 8, further comprising:
    an extension extending aft from the spinner, wherein the extension is defined by an external surface parallel to the inner surface; and
    an annular seal mechanically coupled to the extension.

11. The nose cone assembly of claim 10, wherein a first fastener opening defined by the mating portion is aligned with a second fastener opening defined by the fan hub flange.

12. The nose cone assembly of claim 8, wherein a ratio of a radius of curvature of the flange to a radius of the flange is approximately 1:10.

13. The nose cone assembly of claim 8, wherein a radius of curvature of the flange is between 0.5 inches and 3 inches.

14. The nose cone assembly of claim 8, wherein the flange is continuously curved from the inner surface to the inner mating surface.

15. A gas turbine engine comprising:
    a compressor section configured to rotate about an axis;
    a fan forward of the compressor section, the fan comprising a fan hub configured to rotate about the axis;
    a nose cone assembly forward of the fan and comprising a spinner, wherein an aft flange of the spinner is fastened to a fan hub flange of the fan hub, wherein the aft flange comprises a semi-toroidal geometry; and a filler contacting the aft flange, wherein the filler comprises a continuous annular geometry with a triangular cross section.

16. The gas turbine engine of claim 15, wherein the spinner comprises an inner surface having a substantially flat contour, wherein an inner curved surface of the aft flange is substantially tangential to the inner surface of the spinner.

17. The gas turbine engine of claim 16, wherein the spinner comprises a laminar composite structure.

18. The gas turbine engine of claim 16, wherein a ratio of a radius of curvature of the aft flange to a radius of the aft flange is between 1:5 and 1:15.

* * * * *